US008125217B2

(12) United States Patent
Dmytriw et al.

(10) Patent No.: US 8,125,217 B2
(45) Date of Patent: Feb. 28, 2012

(54) MAGNETORESISTIVE ARRAY DESIGN FOR IMPROVED SENSOR-TO-MAGNET CARRIER TOLERANCES

(75) Inventors: Anthony Dmytriw, DeKalb, IL (US); Kent E. Van Ostrand, Freeport, IL (US)

(73) Assignee: Honeywell International, Inc., Morristown, NJ (US)

( * ) Notice: Subject to any disclaimer, the term of this patent is extended or adjusted under 35 U.S.C. 154(b) by 693 days.

(21) Appl. No.: 12/251,022

(22) Filed: Oct. 14, 2008

(65) Prior Publication Data

US 2009/0256553 A1  Oct. 15, 2009

Related U.S. Application Data

(63) Continuation-in-part of application No. 12/103,348, filed on Apr. 15, 2008.

(51) Int. Cl.
*G01B 7/30* (2006.01)
*G01R 33/02* (2006.01)
(52) U.S. Cl. ......... 324/207.21; 324/207.24; 324/207.25
(58) Field of Classification Search ............. 324/207.21, 324/207.25, 207.24
See application file for complete search history.

(56) References Cited

U.S. PATENT DOCUMENTS

| 6,097,183 | A | 8/2000 | Goetz et al. ............. 324/207.12 |
| 6,806,702 | B2* | 10/2004 | Lamb et al. ............. 324/207.25 |
| 7,030,604 | B1 | 4/2006 | Dmytriw et al. ......... 324/207.12 |
| 7,173,414 | B2 | 2/2007 | Ricks et al. ............. 324/207.25 |
| 7,277,802 | B1 | 10/2007 | Dmytriw ......................... 702/50 |
| 7,280,927 | B1 | 10/2007 | Dmytriw ......................... 702/45 |
| 7,408,343 | B2 | 8/2008 | Dmytriw et al. ............. 324/252 |

OTHER PUBLICATIONS

PCT—ISR—Honeywell International Inc. H0010364-0769, PCT/US2006/035482.
PCT—Written Opinion of the International Searching Authority, PCT/US2006/035482.

* cited by examiner

*Primary Examiner* — Reena Aurora
(74) *Attorney, Agent, or Firm* — Shumaker & Sieffert, P.A.

(57) ABSTRACT

An AMR array magnetic position sensing method and system for improving sensor-to-magnet carrier misposition. A magnetic carrier can be provided, which maintains two or more magnets with angled magnetic vectors position above an array of AMR array sensors. The magnet carrier can then be passed over the AMR array sensors to generate an output signal having less susceptibility to variations in air gap because the angles of flux lines generated by the magnets do not change much with air gap variation. The AMR array sensors are generally sensitive to variation in a direction being sensed, because a constant magnetic field angle sensed by AMR runners located on the AMR array sensors do not change with respect to variation in other directions.

20 Claims, 3 Drawing Sheets

MAGNETORESISTIVE ARRAY DESIGN FOR IMPROVED SENSOR-TO-MAGNET CARRIER TOLERANCES

CROSS-REFERENCE TO RELATED APPLICATION

This patent application is a Continuation-in-Part (CIP) of U.S. patent application Ser. No. 12/103,348, entitled "Method and System for Providing a Linear Signal From A Magnetoresistive Position Sensor" which was filed on Apr. 15, 2008, the disclosure of which is incorporated herein by reference in its entirety.

TECHNICAL FIELD

Embodiments are generally related to sensor methods and systems. Embodiments are also related to magnetic position sensors. Embodiments are additionally related to anisotropic magnetoresistive (AMR) array magnetic designs for improving sensor-to-magnet carrier tolerances.

BACKGROUND OF THE INVENTION

Magnetoresistive (MR) technology can be utilized in a variety of commercial, consumer, and industrial detection applications. Anisotropic magnetoresistive (AMR) properties of a material relate generally to the dependence of electrical resistance at the angle between the direction of electrical current and orientation of magnetic field is observed. AMR array position sensors yield a very accurate signal with respect to the position of a magnet. In conventional MR systems, a device can be provided for determining the position of a member movable along a path. In such a device, a magnet can be attached to the movable member and an array of AMR sensors are located adjacent the path. As the magnet approaches, passes, and moves away from a sensor, the sensor provides a varying output signal, which can be represented by a single characteristic curve that is representative of any of the sensors.

To determine the position of the movable member, the sensors are electronically scanned and data can be selected from a group of sensors having an output that indicates relative proximity to the magnet. A curve-fitting algorithm can then be utilized to determine a best fit of the data to the characteristic curve. The position of the magnet and, therefore, the movable member may be determined by placing the characteristic curve along a position axis.

In another conventional MR device, a position determining apparatus can be implemented, which includes a magnet that is attached to a movable member that moves along a predefined path of finite length. An array of sensors can be located adjacent to the predefined path. The transducers can provide an output signal as the magnet approaches, passes, and moves away from each transducer. A correction mechanism can also be implemented to correct for residual error caused by the non-linearity of the transducers. Such a correction mechanism preferably approximates the residual error with a predetermined function and applies correction factors that correspond to the predetermined function to offset the residual error. By correcting for the non-linearity of the transducers, the length of the magnet may be reduced and/or the spacing of the transducers may be reduced which, in turn, changes the signals generated from the AMR sensors respect of position.

Referring to FIGS. 1A and 1B, a prior art AMR array magnetic sensing system 100 and 150 are illustrated. The AMR array magnetic sensing system 100 and 150 generally includes a magnet 110 and an AMR array sensor 130 to sense the relative position of the magnet 110 within the array of AMR sensors 130. The magnet 110 must be positioned such that the magnetic flux lines 120 of the magnet 110 are in the same plane of the AMR array sensor 130. The magnet 110 generates magnetic flux lines 120 while moving in the direction as indicated by the arrow 140. If the air gap between the magnet 110 and AMR array sensor 130 is changed significantly according to the position of the magnet 110, the performance of the AMR array sensor 130 is reduced. FIG. 1B illustrates the different direction of the magnetic flux lines 120 wherein the magnet still moves in the same direction 140 with respect to the AMR array sensor 130. A signal can be generated as the magnet 110 moves and passes through the AMR array sensor 130. The position at which the magnetic flux lines are parallel or perpendicular to the AMR sensor runners 135 changes with respect to the air gap changes which, in turn, changes the signal generated from the AMR array sensors 130 despite the magnet not moving in direction 140.

The problem associated with such prior art AMR array magnetic device 100 and 150 is that as the distance between the AMR array sensor 130 and the magnet 110 changes, the signal changes decreasing repeatability of the sensor. As shown in FIG. 2, another prior art AMR array magnetic sensing system 200 have attempted to solve such problem by utilizing the magnet carrier 210 holding two magnets 220. The magnet carrier 210 can be placed over the AMR array sensors 240 and made to travel along the direction 250. The magnet carrier 210 can then be passed over the AMR array sensors 240 which comprise AMR runners 245 to produce less variable magnetic flux lines 230 with respect to air gap.

A problem associated with such approach is that the system 200 is sensitive to variation in directions other than the sensed direction. For example, the system 200 is susceptible to variation in 'x' direction although air gap variation in 'z' direction is virtually undetectable and the position of the magnet carrier in 'y' direction is still quantifiable. Consequently, positional information in 'y' direction (sensed direction) changes with variation in the 'x' direction, which is not desirable. Hence, the overall performance and the sensor-to-magnetic carrier tolerance of such prior art AMR array sensor decreases. It is, therefore, believed that a solution to the problems associated with such prior art sensor devices is the design and configuration of an improved AMR array magnetic design for improved sensor-to-magnet carrier tolerances, as described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for improved sensor methods and systems.

It is another aspect of the present invention to provide for an improved position detection device.

It is a further aspect of the present invention to provide for an improved AMR magnetic sensor for sensing the position of a magnet.

It is yet another aspect of the present invention to provide for an AMR array magnetic design that improves sensor-to-magnet carrier tolerances.

The aforementioned aspects and other objectives and advantages can now be achieved as described herein. An AMR array magnetic position sensing system and method for improving sensor-to-magnet carrier tolerances is disclosed, which includes the use of a magnetic carrier that maintains two or more magnets in an angular magnetic vector position above an array of AMR array sensors. The magnet carrier can then be passed over the AMR array sensors to generate an output signal having less susceptibility to variations in air gap as the angles of flux lines generated by the magnets are not changing as much with air gap variation. The AMR array sensors are sensitive to variation in a direction being sensed because the magnetic field angle sensed by AMR runners on the AMR array sensors is not changing with respect to variation in other directions.

The magnets are arranged in an angular position or magnetic vector position to sense a change in position associated with the magnet carrier in a desired direction. Such an AMR array magnetic sensor design can improve the performance of the AMR array sensors with respect to changes of air gap and reduces output signal variations other than sensed directions. The AMR array sensor can sense the linear and rotary position of the magnet while the magnet carrier is moving in the linear or rotary magnetized direction to efficiently sense the position of the moving magnet carrier. The AMR array magnetic sensor can also be configured on a printed circuit board (PCB). Such an AMR array magnetic sensor system can improve sensor-to-magnet carrier tolerances.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1A:
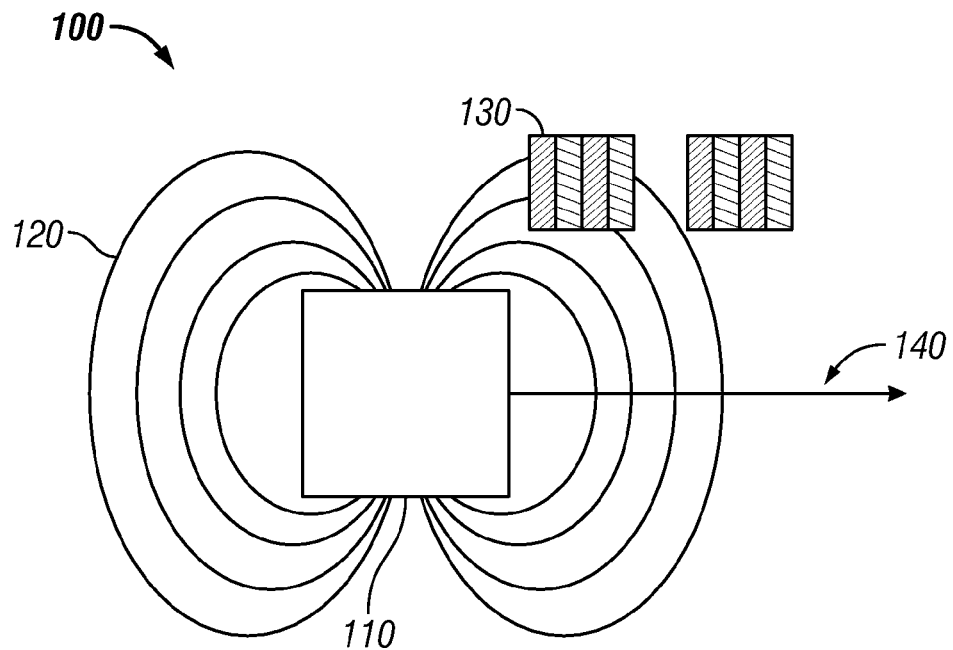
FIGS. 1A and 1B illustrates a prior art magnetoresistive array sensor system.
Figure 1B:
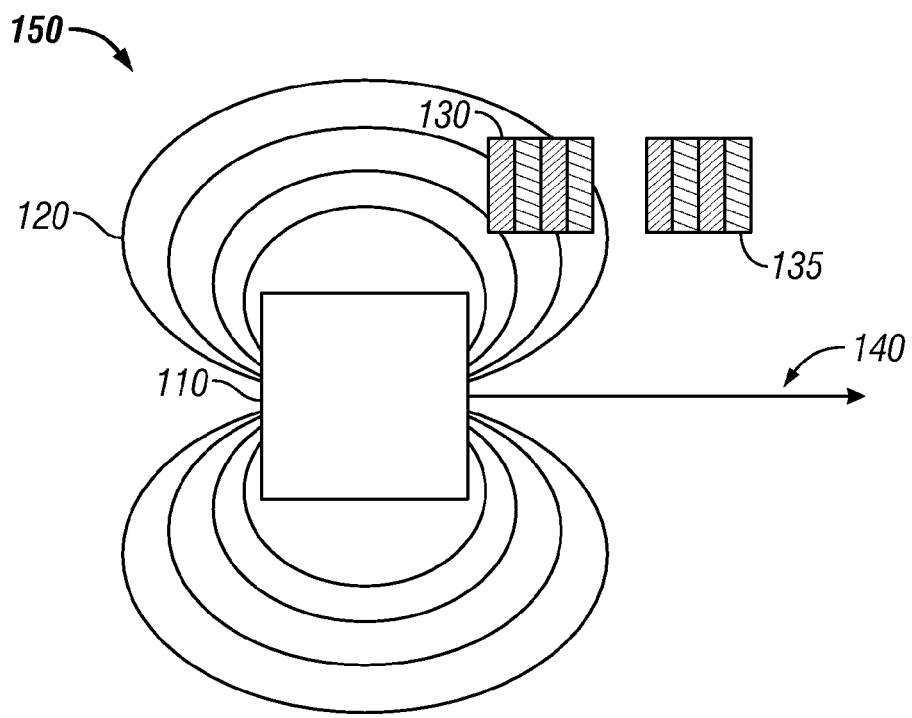
Figure 2:
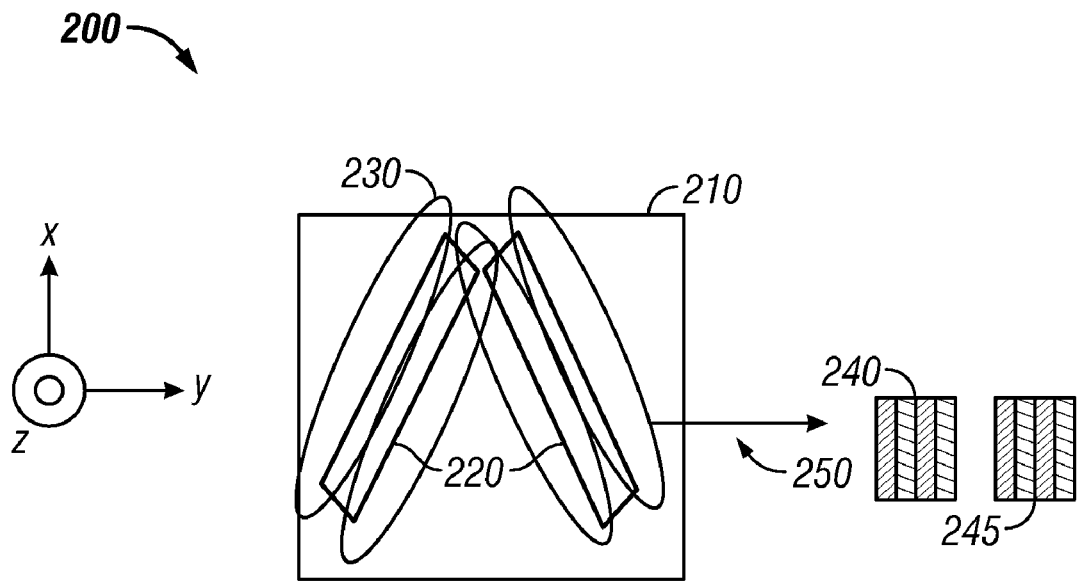
FIG. 2 illustrates another prior art AMR array magnetic sensor system.
Figure 3:
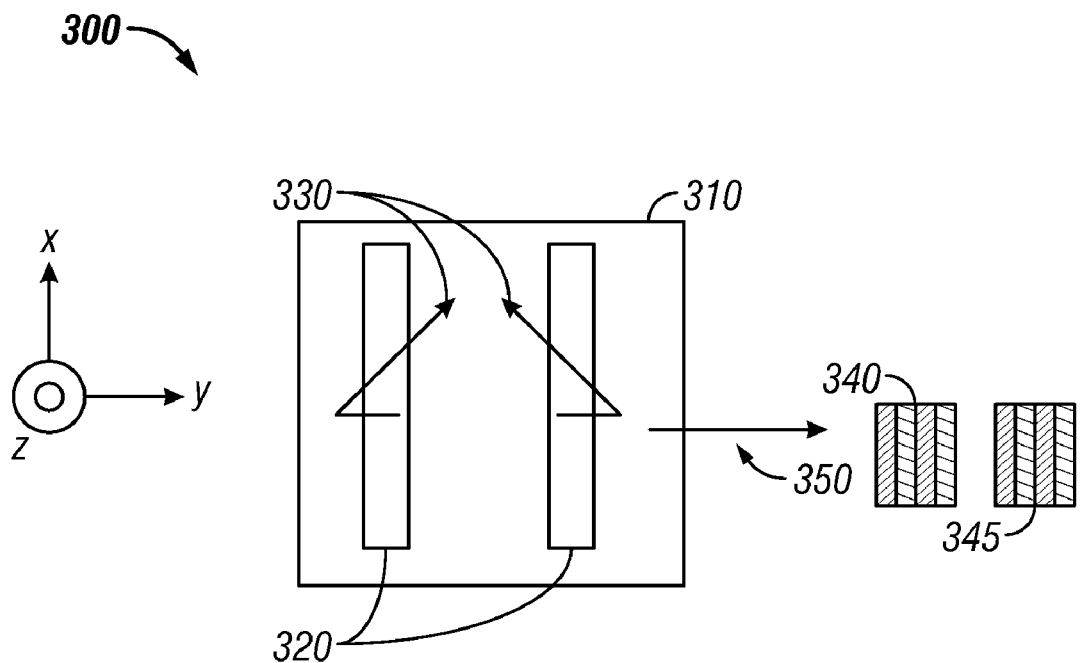
FIG. 3 illustrates a perspective view of an AMR array magnetic sensor system, in accordance with a preferred embodiment.

FIG. 3 illustrates a perspective view of an AMR array magnetic sensor system 300, in accordance with a preferred embodiment. In the following description of the exemplary embodiment, reference is made to the accompanying drawings, which form a part hereof, and in which is shown by way of illustrating the specific embodiment in which the invention may be practiced. It is to be understood that other embodiments may be utilized as structural changes and may be made without departing from the scope of the present invention. The AMR array magnetic system 300 generally includes a magnet carrier 310, which maintains two magnets 320 and an AMR array sensor 340. The magnets 320 are generally magnetized perpendicular to one another to create uniform magnetic flux lines thereof. The AMR position sensing system 300 can also include the use of an array of AMR array sensors 340 having one or more AMR runners 345 located respectively external to the two magnets 320. The magnets 320 enclosed in the magnet carrier 310, move along a path and are generally located centrally above the array of AMR array sensors 340. Note that as utilized herein, the term "above" can refer to both the positive and negative 'z' direction.

Arrows 330 represents the angular position or magnetic vector associated with system 300. The magnets 320 are arranged parallel to one another while their magnetic vectors, as shown by arrows 330, allow the AMR array sensors 340 to sense a change in position associated with the magnet carrier 310 in a desired movement direction 350. The AMR array sensors 340 can therefore be configured as a single anisotropic magnetoresistive (AMR) permalloy sensing bridge (not shown) configured from four thin-film resistors located at a fixed point from magnets the 320 to provide a sinusoidal voltage signal as the resultant flux density vector varies with magnet travel. A magnet travel position can then be determined from the sinusoidal signal voltage curve. The AMR effect changes a resistance of a magneto-resistive effect element in proportion to a square of a cosine of an angle formed between the magnetization of the element and the direction in which a sense current that flows through the element is conducted. AMR occurs in certain ferrous materials such as, for example, Permalloy, and can be applied as a thin strip to function as a resistive element.

The magnet carrier 310 can be placed over the AMR array sensors 340 and made to travel along the direction 350. The AMR array sensors 340 can come into contact with the uniform magnetic flux lines to sense a change in linear and angular position associated with the magnet carrier 310. The array of AMR position sensors 340 can provide output signals as the magnet carrier 310 passes and moves away from each AMR array sensors 340. The output signal has less susceptibility to variations in air gap, the distance between the magnet carrier 310, and the AMR position sensors 340 as the angles of the flux lines do not change as much with air gap variation. The AMR array sensors 340 are generally sensitive to variation in a direction being sensed because a magnetic field angle sensed by AMR runners 345 on the AMR array sensor 340 does not change with respect to variations in other directions. For example, as depicted in FIG. 3, the AMR array sensor 340 is no longer sensitive to either variation in the 'x' direction or in 'z' direction, but remains very sensitive to movements in the 'y' direction (i.e., the sensed direction).

Figure 4:
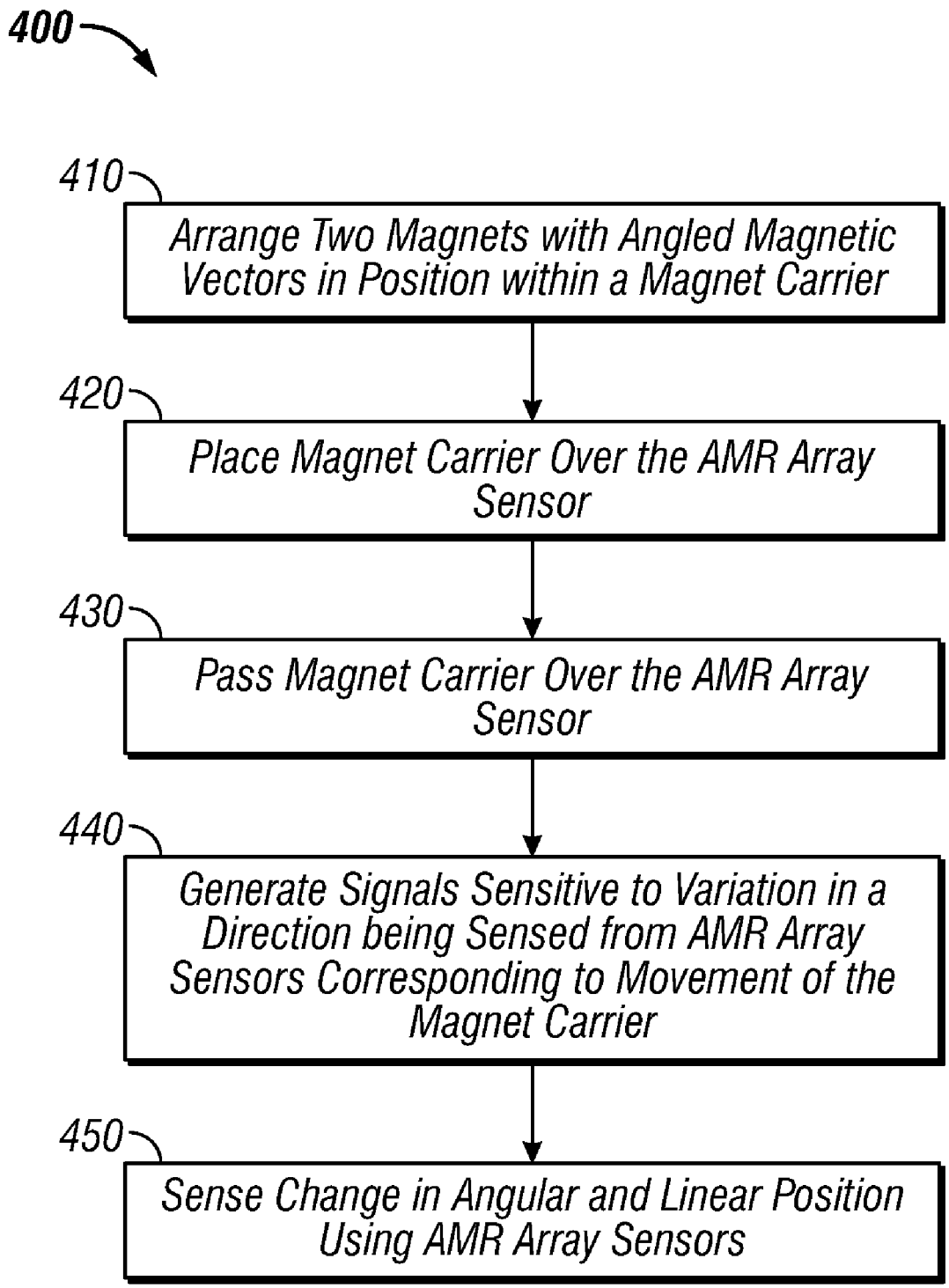
FIG. 4 illustrates a detailed flow chart of operations illustrating logical operational steps of a method for improving sensor-to-magnet carrier tolerances utilizing an AMR array magnetic sensor system, in accordance with a preferred embodiment.

FIG. 4 illustrates a detailed flow chart of operations illustrating logical operational steps of a method 400 for improving sensor-to-magnet carrier tolerances utilizing AMR array magnetic sensor system 300, in accordance with a preferred embodiment. Note that in FIGS. 3-4, identical and similar parts or elements are referred by identical reference numerals. A magnet carrier 310 with two magnets 320 can be arranged in an angular magnetic vector position, as illustrated at block 410. Next, as depicted at block 420, the magnet carrier 310 can be placed over the AMR array sensor 340. The magnet carrier 310 can be passed over the AMR array sensor 340, as shown at block 430. Thereafter, the signals from the AMR array sensors 340 can be generated corresponding to the movement of the magnet carrier 310 in a sensed direction, as illustrated at block 440. Finally, as depicted at block 450, change in angular and linear position can then be sensed using AMR array sensors 340 and the signals generated by the sensors 340 have less susceptibility to variations in air gap as the angles of the flux lines are not changing as much with air gap variation. The AMR array sensors 340 are sensitive to variation in a direction being sensed in order to improve sensor-to-magnet carrier tolerances.

It is believed that by utilizing the approach described herein, a number of advantages will result. For example, the sensor flexibility can be increased significantly by placing the magnet carrier 310 over the AMR array sensor 340. The disclosed approach can also serve to increase the air gap performance and eliminate output signal variations in undesirable directions. Another advantage stems from the fact that the AMR array position sensor 340 can be employed to detect both the linear and rotary position of the magnet, while the magnet carrier 310 moves in a linear or rotary magnetized direction to efficiently sense the position of the moving magnet carrier 310. The disclosed array can also be configured on a printed circuit board (PCB). Such an AMR array magnetic sensor system 300 can improve sensor-to-magnet carrier tolerances.

It will be appreciated that variations of the above-disclosed and other features and functions, or alternatives thereof may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method, comprising:
    arranging at least two magnets with angled magnetic vectors positioned within a magnet carrier;
    passing said magnet carrier over a plurality of AMR array sensors, wherein said magnet carrier generates a plurality of uniform magnetic flux lines thereof; and
    generating an output signal that is sensitive to a variation in a direction being sensed by said plurality of AMR array sensors while a constant magnetic field angle detected by a plurality of AMR runners disposed on said plurality of AMR array sensors does not change with respect to a variation in other directions, thereby improving said plurality of AMR array sensors with respect to a misposition of said magnet carrier and with respect to said plurality of AMR array sensors.

2. The method of claim 1 further comprising;
    detecting a change in a linear position and an angular position associated with said magnet carrier utilizing said plurality of AMR array sensors.

3. The method of claim 1 further comprising configuring said plurality of AMR array sensors to comprise an array of magnetoresistive-sensing components.

4. The method of claim 1 further comprising configuring said at least two magnets to comprise a first magnet and a second magnet located at a particular distance from one another to thereby generate said plurality of uniform magnetic flux lines between said at least two magnets.

5. The method of claim 1 further comprising:
    configuring said plurality of AMR array sensors to possess a reduced sensitivity with respect to variations in undesirable directions.

6. The method of claim 1 further comprising:
    configuring said plurality of AMR array sensors to comprise an array of magnetoresistive-sensing components; and
    detecting a change in a linear position and an angular position associated with said magnet carrier utilizing said plurality of AMR array sensors.

7. The method of claim 1 further comprising:
    configuring said at least two magnets to comprise a first magnet and a second magnet located at a particular distance from one another to thereby generate said plurality of uniform magnetic flux lines between said at least two magnets; and
    configuring said plurality of AMR array sensors to possess a reduced sensitivity with respect to variations in undesirable directions.

8. The method of claim 1 further comprising:
    configuring said plurality of AMR array sensors to comprise an array of magnetoresistive-sensing components;
    detecting a change in a linear position and an angular position associated with said magnet carrier utilizing said plurality of AMR array sensors;
    configuring said at least two magnets to comprise a first magnet and a second magnet located at a particular distance from one another to thereby generate said plurality of uniform magnetic flux lines between said at least two magnets; and
    configuring said plurality of AMR array sensors to possess a reduced sensitivity with respect to variations in undesirable directions.

9. A method, comprising:
    arranging at least two magnets with angled magnetic vectors positioned within a magnet carrier;
    passing said magnet carrier over a plurality of AMR array sensors, wherein said magnet carrier generates a plurality of uniform magnetic flux lines thereof;
    generating an output signal that is sensitive to a variation in a direction being sensed by said plurality of AMR array sensors while a constant magnetic field angle detected by a plurality of AMR runners disposed on said plurality of AMR array sensors does not change with respect to a variation in other directions, thereby improving said plurality of AMR array sensors with respect to a misposition of said magnet carrier and with respect to said plurality of AMR array sensors; and
    detecting a change in a linear position and an angular position associated with said magnet carrier utilizing said plurality of AMR array sensors.

10. The method of claim 9 further comprising configuring said plurality of AMR array sensors to comprise an array of magnetoresistive-sensing components.

11. The method of claim 9 further comprising configuring said at least two magnets to comprise a first magnet and a second magnet located at a particular distance from one another to thereby generate said plurality of uniform magnetic flux lines between said at least two magnets.

12. The method of claim 9 further comprising:
    configuring said plurality of AMR array sensors to possess a reduced sensitivity with respect to variations in undesirable directions.

13. A system, comprising:
    at least two magnets with angled magnetic vectors positioned within a magnet carrier;
    a plurality of AMR array sensors associated with said at least two magnets, wherein said magnet carrier is capable of passing over said plurality of AMR array sensors, such that said magnet carrier generates a plurality of uniform magnetic flux lines thereof; and
    an output mechanism for generating an output signal that is sensitive to a variation in a direction being sensed by said plurality of AMR array sensors while a constant magnetic field angle detected by a plurality of AMR runners disposed on said plurality of AMR array sensors does not change with respect to a variation in other directions, thereby improving said plurality of AMR array sensors with respect to a misposition of said magnet carrier and with respect to said plurality of AMR array sensors.

14. The system of claim 13 wherein said plurality of AMR array sensors assists in detecting a change in a linear position and an angular position associated with said magnet carrier.

15. The system of claim 13 wherein said plurality of AMR array sensors comprises an array of magnetoresistive-sensing components.

16. The system of claim 13 wherein said at least two magnets comprise a first magnet and a second magnet located at a particular distance from one another to thereby generate said plurality of uniform magnetic flux lines between said at least two magnets.

17. The system of claim 13 wherein said plurality of AMR array sensors is configured to possess a reduced sensitivity with respect to variations in undesirable directions.

18. The system of claim 13 wherein said plurality of AMR array sensors comprises an array of magnetoresistive-sensing components and said plurality of AMR array sensors is capable of detecting a change in a linear position and an angular position associated with said magnet carrier.

19. The system of claim 13 wherein:
said at least two magnets comprise a first magnet and a second magnet located at a particular distance from one another to thereby generate said plurality of uniform magnetic flux lines between said at least two magnets; and
said plurality of AMR array sensors is configured to possess a reduced sensitivity with respect to variations in undesirable directions.

20. The system of claim 13 wherein:
said plurality of AMR array sensors comprises an array of magnetoresistive-sensing components and said plurality of AMR array sensors is capable of detecting a change in a linear position and an angular position associated with said magnet carrier;
said at least two magnets comprise a first magnet and a second magnet located at a particular distance from one another to thereby generate said plurality of uniform magnetic flux lines between said at least two magnets; and
said plurality of AMR array sensors is configured to possess a reduced sensitivity with respect to variations in undesirable directions.

* * * * *